UNITED STATES PATENT OFFICE.

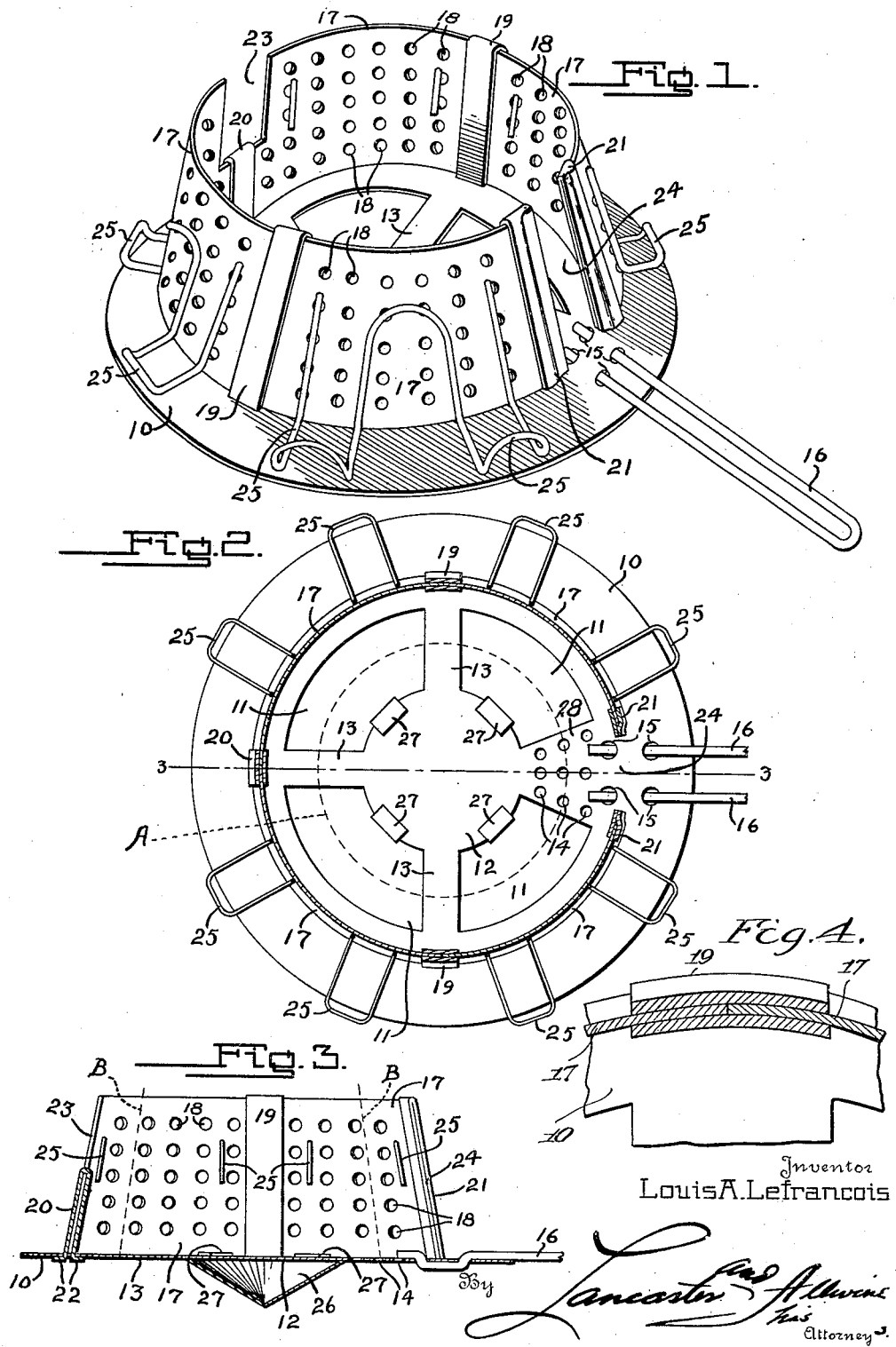

LOUIS A. LEFRANCOIS, OF SAN FRANCISCO, CALIFORNIA.

COMBINED TOASTER AND BOILER-SUPPORT.

1,321,318. Specification of Letters Patent. Patented Nov. 11, 1919.

Application filed November 27, 1917. Serial No. 204,243.

*To all whom it may concern:*

Be it known that I, LOUIS A. LEFRANCOIS, a citizen of the United States, and a resident of San Francisco, in the county of San Francisco and State of California, have invented a certain new and useful Improvement in Combined Toasters and Boiler-Supports, of which the following is a specification.

The present invention relates to cooking utensils, and has more particular reference to a device upon which bread or the like may be toasted, and upon which may be supported a coffee pot, a tea pot, a kettle or the like for the purpose of boiling and cooking simultaneously with the toasting of the bread.

An object of the present invention is to provide a relatively simply constructed device which may be made from sheet metal and lengths of wire; which is relatively strong and durable; and which may be economically manufactured.

The above, and various other objects and advantages of this invention will be in part described, and in part understood, from the following detailed description of the present preferred embodiment, the same being illustrated in the accompanying drawing wherein:

Figure 1 is a perspective view of a combined toaster and boiler support constructed according to the present invention.

Fig. 2 is a horizontal section taken through the same.

Fig. 3 is a vertical section taken through the device substantially on the line 3—3 of Fig. 2.

Fig. 4 is an enlarged fragmentary view of the meeting ends of a pair of the wall segments and the connecting strap for holding them together and upon the base.

Referring to the drawing, 10 designates a base plate which is preferably of circular form and provided with segmental openings 11 therein. The base plate 10 is of a diameter sufficient to fit over the burner of a gas stove or the like, and the outer marginal edges of the openings 11 are formed on the arcs of a circle which is of greater diameter than the diameter of the usual pot or kettle which is used in boiling water, making tea or coffee, and the like.

The plate 10 is provided at its central portion with a supporting disk 12 of relatively small diameter, and which is connected to the ring or body part of the plate 10 by a plurality of radially extending arms 13, the latter being of sufficient width only to amply support the disk 12. The disk 12, and the arms 13, are preferably integral with the ring or body portion of the plate 10, and preferably lie in the same plane thereof. The plate 10 has, at one side, a relatively wide outwardly diverging radial portion 28 joining the disk 12 to the ring, and provided with a plurality of perforations 14 therethrough through which heat may radiate upwardly when the device is placed over the burner. The plate 10 is provided with substantially radially spaced apart pairs of apertures 15 having extending therethrough the free ends of a returned bail or handle 16 constructed of wire or other suitable material. The ends of the handle 16 are offset and lie against the underside of the plate 10, and are returned upwardly through the inner openings 15 and bear against the upper side of the plate 10 and the said perforated arm 13. The handle 16 is thus held rigidly to the plate 10 and may be employed for shifting the device during use.

The plate 10 is provided about its inner marginal edge with an upstanding wall or flange, the latter comprising a plurality of arcuate plate sections 17, shown in the present instance as four in number, and provided with perforations 18 extending throughout the length of the sections. The sections 17 are of arcuate form and, when assembled, provide a frusto-conical body portion for the plate 10. The sections 17 are mounted with their lower edges upon the upper face of the plate 10, and with the adjacent end portions of the sections 17, arranged in abutting relation. The sections 17 are held in this position by straps 19, 20 and 21. The straps 19, 20 and 21 are provided upon their lower ends with tongues 22 which project downwardly through slots formed in the plate 10, and which are overturned against the lower side of the plate to hold the straps firmly thereto. The straps are looped upwardly over the wall sections 17 and lie closely against the inner and outer sides thereof to retain the same in abutting relation at their adjacent edges, and to hold the sections firmly against the plate 10. Two of the adjacent end portions of the sections 17 arranged in diametrically opposed relation with respect to the handle 16, are recessed or cut away at their upper edges to provide an opening 23. At the handle side of the device the adjacent sections 17 have their end portions in closely spaced-apart relation, and located at the opposite sides of the handle 16. This construction provides an opening 24 which is arranged diametrically opposite to the slot 23. The strap 20 engages over the meeting ends of the sections 17 in the opening 23, and is consequently relatively short. The straps 21 engage over the free end edges of the sections 17 at the opposite sides of the handle 16, and preferably have their outer opposite edges crimped into abutting relation to retain the sections 17 from crowding toward each other through the straps 21.

The plate 10 provides a ledge extending annularly about the body part of the device, and each section 17 is provided with one or more racks 25 which are preferably formed from single lengths of wire.

Each rack 25 has its length of wire bent substantially U-shaped and provided with returned portions on its opposite free ends. The extremities of the returned portions are engaged through suitably formed apertures in the adjacent sections 17, and are overturned against the inner sides of the sections to hold the racks in place. The racks 25 are bent to conform to the angle between the said ledge and the outer sides of the adjacent sections 17, and have their outer rounded ends upturned slightly to retain the slices of bread or the like upon the racks.

For the purpose of deflecting the heat upwardly through the openings 11 in the base plate 10, the disk 12 is provided against its underside with a downwardly projecting deflecting cone 26 preferably formed from sheet metal and provided with a plurality of tongues 27 which are bent over the marginal edge of the disk 12 and against the upper face of the latter.

It is evident that the body of the device tapers upwardly, is open at its top to receive articles into the body, and has a support in the body spaced below the opening in the top thereof. Also, the support provides means for deflecting heat rising through the body toward the perforated walls thereof and against the toast racks which are arranged exteriorly of the walls, particularly when an article or a receptacle is introduced through the open top of the body.

In use, the plate 10 is placed over the burner of a gas stove or the like. A pot or kettle is fitted down within the wall or body part and rests upon the arms 13 and the disk 12. The position of the bottom of the pot or kettle is shown in dotted lines at A in Fig. 2, and it will be noted that the opening 11 is of sufficient size to provide ample space between the inner marginal edge of the plate 10 and the outer edge of the pot or receptacle to admit heat to rise upwardly through the body part of the toaster. As shown in dotted lines in Fig. 3 at B, the position of the sides of the receptacle or pot is such that the sides are spaced inwardly from the inner wall of the sectional body of the device to form an annular space through which the heat may pass. The heat is thus concentrated about the lower end of the receptacle, and radiates through the perforations 18 in the wall sections 17. The toast is thus quickly made by the radiating heat through the walls, and the concentration of the heat about the lower end of the receptacle quickly boils or cooks the contents thereof.

Should the receptacle have spouts, handles or the like projecting from the sides thereof and which are arranged adjacent to the bottom of the receptacle, the openings 23 and 24 accommodate such projections of the receptacle so that the latter may rest flat upon the disk 12 and the arms 13.

It is of course understood that the above described structure may be changed in design and construction without departing from the spirit of the invention, and within the scope of the following claims.

I claim:—

1. In a device of the character described, the combination of a body part adapted to fit over a burner and provided with an opening in its top through which articles to be heated may be inserted and a slot in its side to receive the handle of the article, toast racks arranged against the outer side of the body part to receive bread to be toasted, and supporting means in the body part spaced below the top thereof adapted to support the articles therein introduced down through said opening.

2. In a cooking utensil, the combination of a base plate, a body part on the base plate provided with an inclosing perforated wall and an opening in its top through which articles to be heated may be inserted and a slot in its side to receive the handle of the article, a handle on the base plate arranged below the slot, toast racks carried exteriorly by the wall, and a support within the body part for sustaining articles introduced through the opening in the top thereof to heat the articles simultaneously with the toasting.

3. In a cooking utensil, the combination of a base plate provided with a circular row of segmental openings providing a central supporting disk and radiating arms supporting the disk, said disk and arm formed integral with said base plate, an upstanding wall about the inner marginal edges of said base plate, toast racks secured to the outer side of the walls, and a handle carried upon the base plate, said disk within the base plate being adapted to support a receptacle within said annular wall.

4. In a cooking utensil, the combination of a base plate having segmental openings therein, an annular wall upstanding from the inner marginal edge of the base plate and having perforations therein, a plurality of toasting racks secured against the outer side of the said annular wall, said plate being adapted to support a receptacle within the annular wall and said segmental openings being adapted to admit heat upwardly therethrough between the annular wall and the receptacle, and a deflector arranged against the underside of the central portion of said plate.

5. In a cooking utensil, the combination of a body plate provided with segmental openings therein, a plurality of arcuate wall sections upstanding from the body plate and arranged in abutting relation, straps secured to the body plate and being looped upwardly over the meeting ends of said wall sections to hold the latter together, toast racks secured to the outer sides of said wall sections, and a handle mounted on said plate.

6. In a cooking utensil, the combination of a base plate provided with openings therethrough, a plurality of wall sections arranged in abutting relation upon the upper side of the base plate, and a plurality of straps secured at their free ends to the base plate and being looped upwardly over said wall sections to retain the latter in abutting relation upon the base plate, intermediate portions of the base plate within said wall sections being adapted to support a receptacle and said openings in the base plate admitting heat to rise upwardly between the receptacle and said wall sections.

7. In a cooking utensil, the combination of a base plate provided with openings therein, a plurality of arcuate wall sections upstanding from the base plate, straps secured at their free ends to the base plate and being looped upwardly over the meeting ends of said wall sections to retain the latter in abutting relation and on the base plate, a pair of said wall sections having recesses in their upper edges and at their meeting ends to provide an opening through one side of the device, another pair of said wall sections terminating at their adjacent ends in closely spaced-apart relation, and the adjacent straps having their free opposite edges crimped together to engage the adjacent ends of the wall sections and hold the latter from sliding through the straps.

8. In a device of the character described, the combination of a base plate, a hollow body on the base plate having an opening in its top through which articles to be heated may be inserted, and slots in the opposite sides of the body to receive the bail ears of the article, and adapted to receive heat upwardly through the hollow body, and an article support arranged within the body and spaced from the open top thereof.

9. In a device of the character described, the combination of a base plate, a hollow body on the base plate having an opening in its top through which articles to be heated may be inserted and having perforations in its sides adapted to receive heat therethrough passing upwardly through the body, toast racks arranged exteriorly on the body, a support within the body adapted to receive heat passing upwardly therethrough and to deflect the heat toward said perforations and toward the toast racks, said support being adapted to sustain articles to be heated introduced through the opening in the top of the body, said body having slots in opposite sides with one slot extending to the base plate, and a handle on the base plate beneath the last named slot.

LOUIS A. LEFRANCOIS.

Copies of this patent may be obtained for five cents each, by addressing the "Commissioner of Patents, Washington, D. C."